US009849819B2

(12) United States Patent
Farooq et al.

(10) Patent No.: US 9,849,819 B2
(45) Date of Patent: Dec. 26, 2017

(54) HIDDEN FOLDABLE TRAY TABLE

(71) Applicant: Ford Global Technologies, LLC, Dearborn, MI (US)

(72) Inventors: S. M. Iskander Farooq, Novi, MI (US); Scott Holmes Dunham, Redford, MI (US); Dean M. Jaradi, Macomb, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/054,592

(22) Filed: Feb. 26, 2016

(65) Prior Publication Data
US 2017/0246973 A1    Aug. 31, 2017

(51) Int. Cl.
*B60N 3/00* (2006.01)
*B60R 7/04* (2006.01)

(52) U.S. Cl.
CPC ............... *B60N 3/001* (2013.01); *B60R 7/04* (2013.01)

(58) Field of Classification Search
CPC . B64D 11/0638; B64D 11/06; B64D 11/0606; B64D 11/0641; B60N 3/002; B60N 3/004; B60N 3/001; H01L 2924/00; B60R 7/04
USPC ................ 296/24.4, 24.34, 37.8; 108/44
See application file for complete search history.

(56) References Cited

U.S. PATENT DOCUMENTS 1,851,600 A * 3/1932 Stanley ............... A47B 23/041
108/167
2,597,330 A * 5/1952 Huddleston ............ B60N 3/002
108/139
3,547,488 A * 12/1970 Barnes ..................... A47C 7/70
297/154
3,583,760 A * 6/1971 McGregor ............. A47B 5/006
297/145
3,632,161 A * 1/1972 Arfaras .................... A47C 7/70
297/145
5,087,096 A * 2/1992 Yamazaki ................ A47C 7/70
297/145
5,562,049 A * 10/1996 Hoffman .............. A47B 17/065
108/94
5,588,697 A * 12/1996 Yoshida ................. B60N 3/002
108/160
6,032,587 A * 3/2000 Salenbauch .......... B60N 2/4686
108/44

(Continued)

FOREIGN PATENT DOCUMENTS

EP          1405758 B1     9/2006
WO       2015063412 A1     5/2015

*Primary Examiner* — Kiran B Patel
(74) *Attorney, Agent, or Firm* — Vichit Chea; Brooks Kushman P.C.

(57) ABSTRACT

The present disclosure is directed to a table that may be selectively stored in a portion of a vehicle console. An outer housing member having a storage cavity therein attaches to a side of the vehicle console. A support shaft supporting a table is mounted for sliding and rotational movement with respect to the vehicle console. The support shaft is slidable in a first direction from a storage position wherein the table is positioned in a vertical orientation in the cavity of the outer housing member. The support shaft is also rotatable 270 degrees from the storage position to move the table into a horizontal use position after removal from the storage position.

14 Claims, 9 Drawing Sheets

(56) References Cited

U.S. PATENT DOCUMENTS

| | | | | |
|---|---|---|---|---|
| 6,220,660 B1* | 4/2001 | Bedro | B60N 2/468 | 108/44 |
| 6,308,641 B1* | 10/2001 | Kingbury | A47B 5/04 | 108/42 |
| 6,347,590 B1* | 2/2002 | D'Annunzio | B60N 3/002 | 108/25 |
| 6,382,745 B1* | 5/2002 | Adkins | B60N 3/002 | 108/97 |
| 6,454,349 B1* | 9/2002 | Konya | B60N 3/004 | 108/44 |
| 7,143,701 B2 | 12/2006 | Lindstrom et al. | | |
| 7,156,462 B2* | 1/2007 | Verny | B64D 11/06 | 297/354.12 |
| 7,478,868 B2* | 1/2009 | Figueras Mitjans | A47C 7/70 | 297/145 |
| 7,506,923 B1* | 3/2009 | Gauss | B60N 3/002 | 297/149 |
| 7,695,061 B2* | 4/2010 | Olarte | A47C 7/70 | 297/162 |
| 8,020,808 B2* | 9/2011 | Collins | B60N 3/002 | 244/118.5 |
| 8,430,041 B2* | 4/2013 | Moronval | A47B 3/00 | 108/115 |
| 8,505,768 B2* | 8/2013 | Bardwell | A45C 11/20 | 206/564 |
| 8,517,443 B2 | 8/2013 | Hipshier et al. | | |
| 8,616,643 B2* | 12/2013 | Darbyshire | B64D 11/06 | 297/340 |
| 8,672,400 B2* | 3/2014 | Henderson | B60N 3/002 | 297/160 |
| 8,894,121 B2* | 11/2014 | Eilers | B60R 7/04 | 108/44 |
| 8,934,063 B2* | 1/2015 | Boyer, Jr. | B64D 11/0015 | 297/144 |
| 8,997,660 B2* | 4/2015 | Satterfield | A47B 31/06 | 108/44 |
| 9,073,639 B2* | 7/2015 | Thisius | B64D 11/00 | |
| 9,102,409 B2* | 8/2015 | Weil | B60N 2/305 | |
| 9,102,410 B2* | 8/2015 | Frost | B64D 11/06 | |
| 9,138,055 B2* | 9/2015 | Curtis | A47B 83/02 | |
| 9,179,769 B1* | 11/2015 | Port | A47C 1/12 | |
| 9,376,047 B2* | 6/2016 | Ulbrich-Gasparevic | B60N 3/004 | |
| 9,409,647 B2* | 8/2016 | Pajic | A47C 7/70 | |
| 9,512,618 B2* | 12/2016 | Lang | F24J 2/36 | |
| 9,573,687 B2* | 2/2017 | Stephens | B64D 11/0638 | |
| 9,617,001 B2* | 4/2017 | Zimmermann | B64D 11/0015 | |
| 2005/0258672 A1* | 11/2005 | Schweizer | A47C 7/70 | 297/145 |
| 2006/0016372 A1* | 1/2006 | Younse | A47B 21/0314 | 108/44 |
| 2009/0249982 A1* | 10/2009 | Palethorpe | A47B 5/00 | 108/44 |
| 2012/0133180 A1* | 5/2012 | Moulton | B64D 11/0605 | 297/135 |
| 2013/0247797 A1* | 9/2013 | Hisata | B64D 11/00 | 108/43 |
| 2014/0300147 A1* | 10/2014 | Suhre | B60N 2/4606 | 297/170 |
| 2014/0319867 A1* | 10/2014 | von Rothkirch und Panthen | B60N 2/4606 | 296/24.34 |
| 2015/0183355 A1 | 7/2015 | Chang et al. | | |
| 2015/0321592 A1* | 11/2015 | De Morais | B64D 11/06 | 297/147 |
| 2016/0015170 A1* | 1/2016 | Schulman | A47B 23/02 | 108/91 |
| 2016/0221677 A1* | 8/2016 | Hance | B64D 11/0638 | |
| 2016/0221678 A1* | 8/2016 | Maillaut | B64D 11/0605 | |
| 2016/0375810 A1* | 12/2016 | Kong | B60N 2/4686 | 297/145 |

* cited by examiner

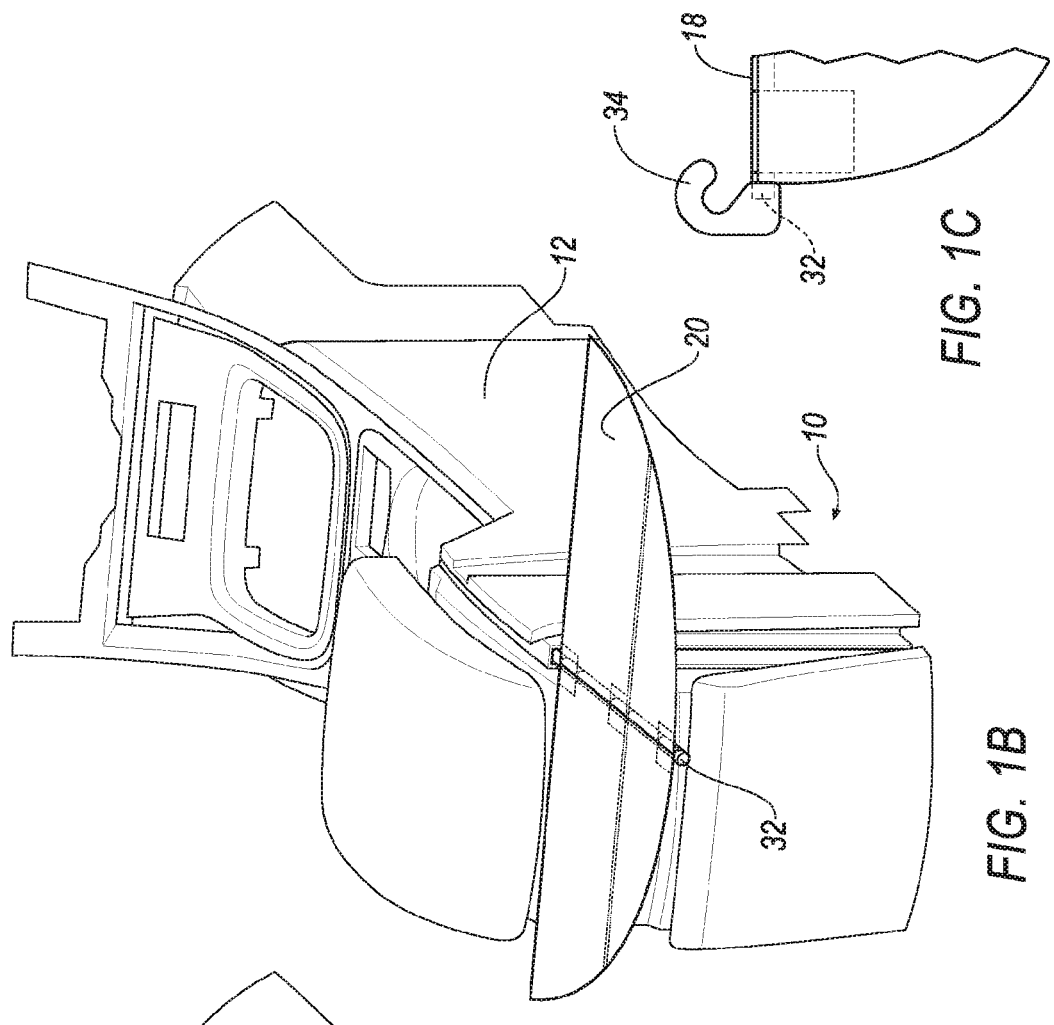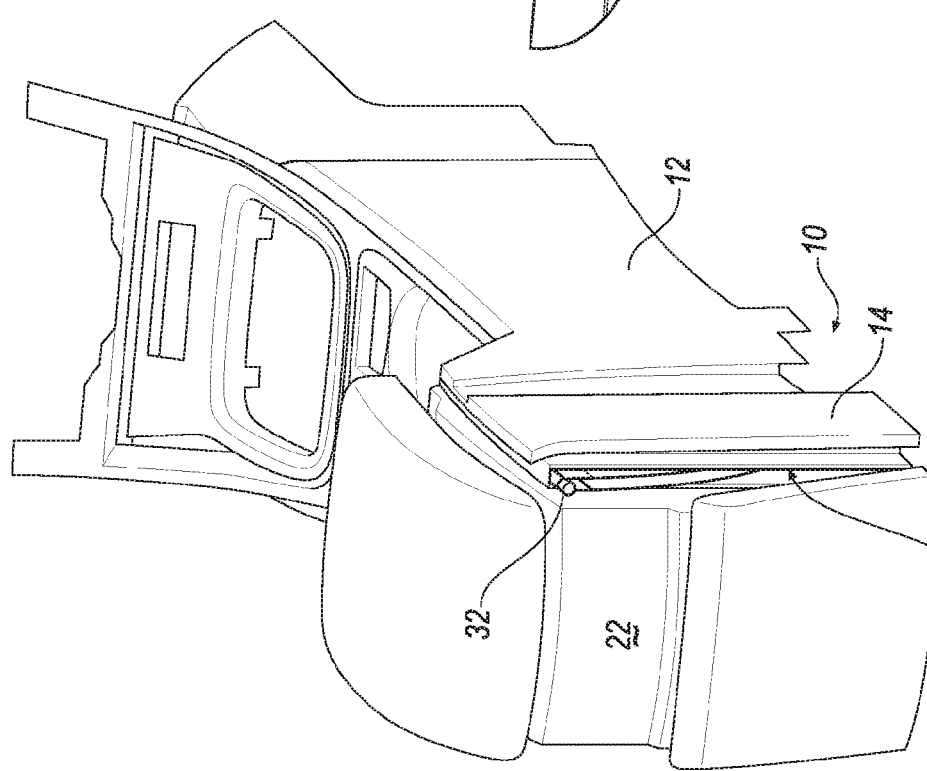

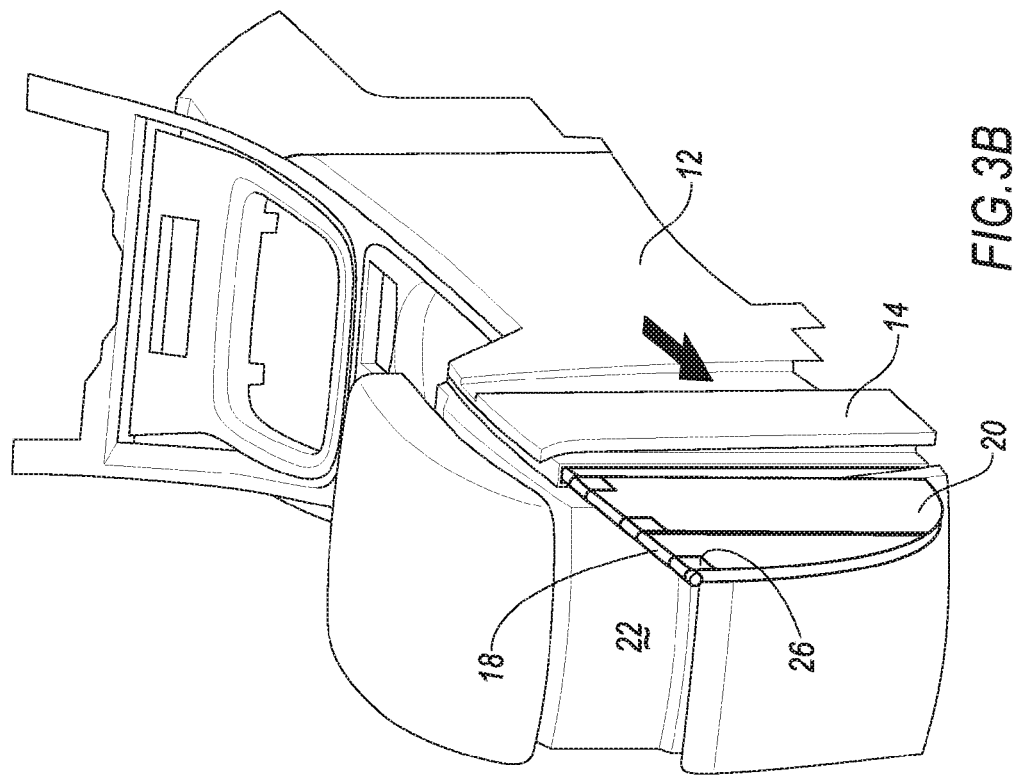
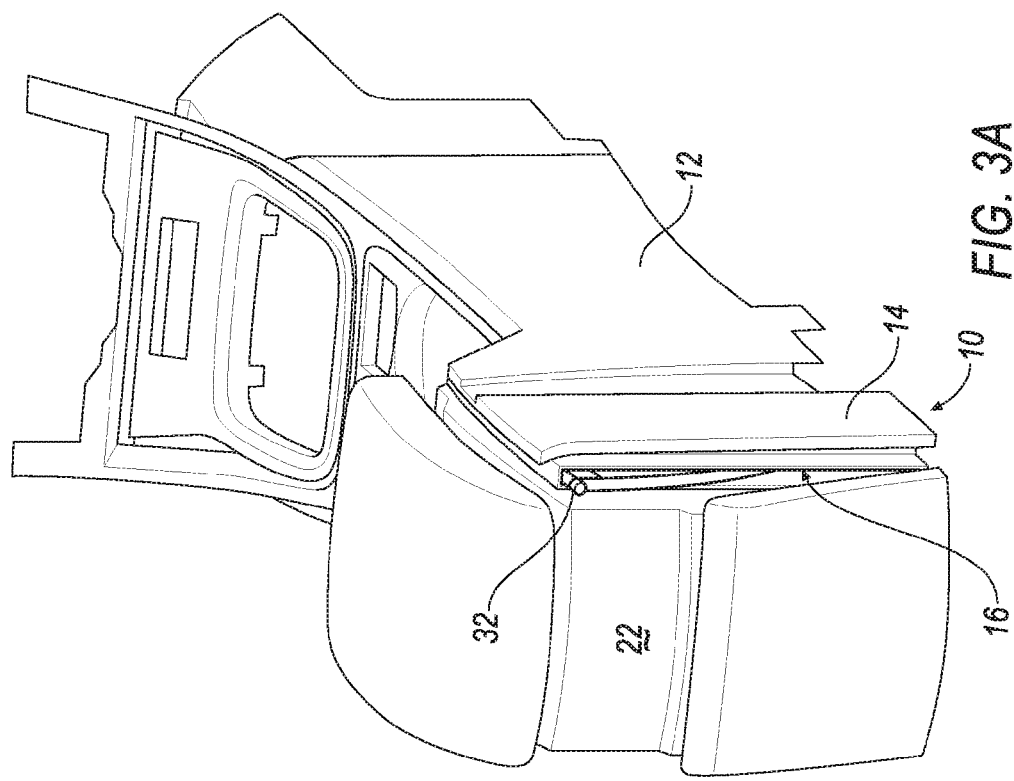

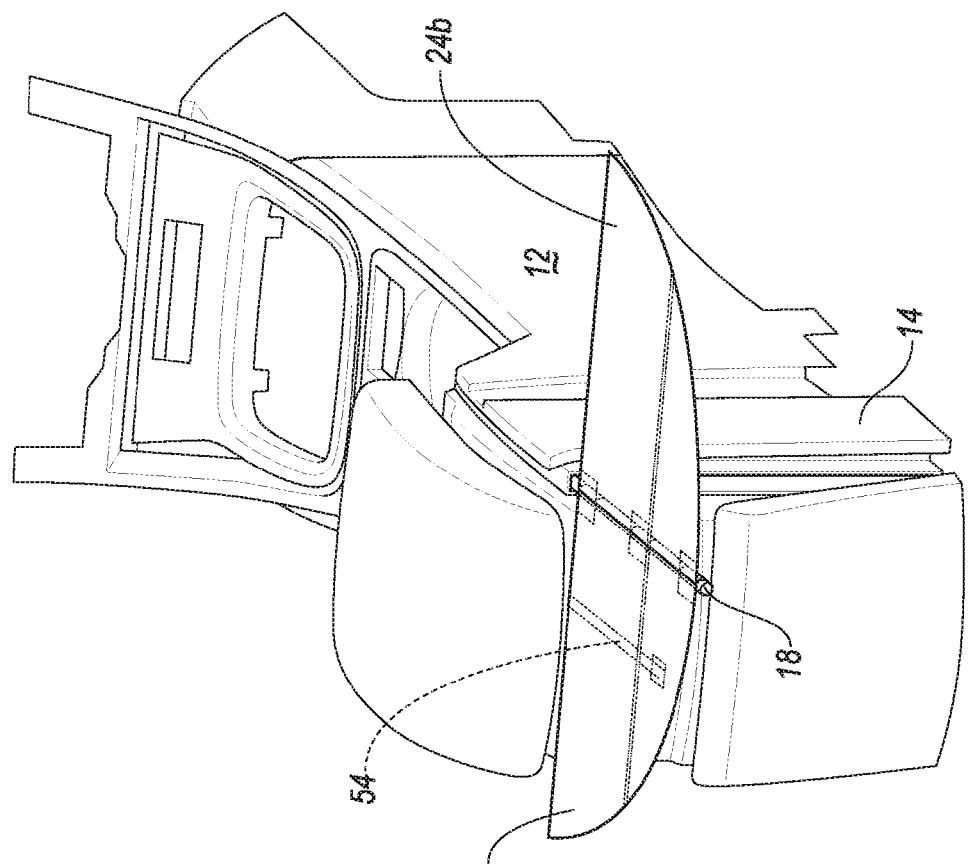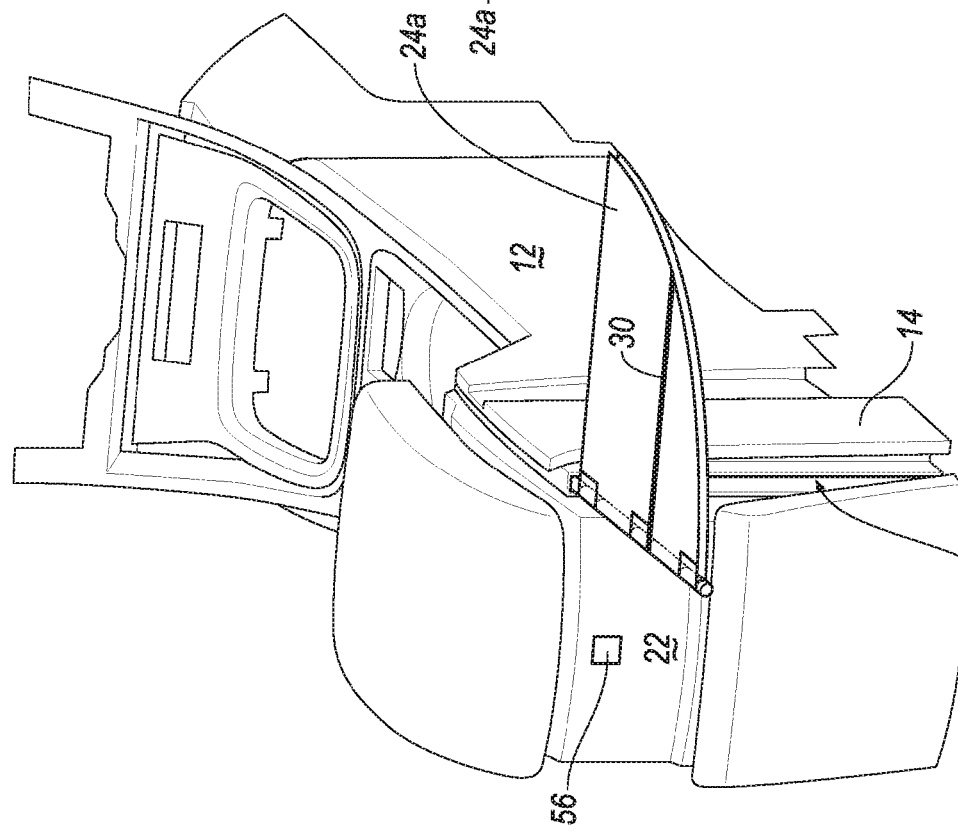

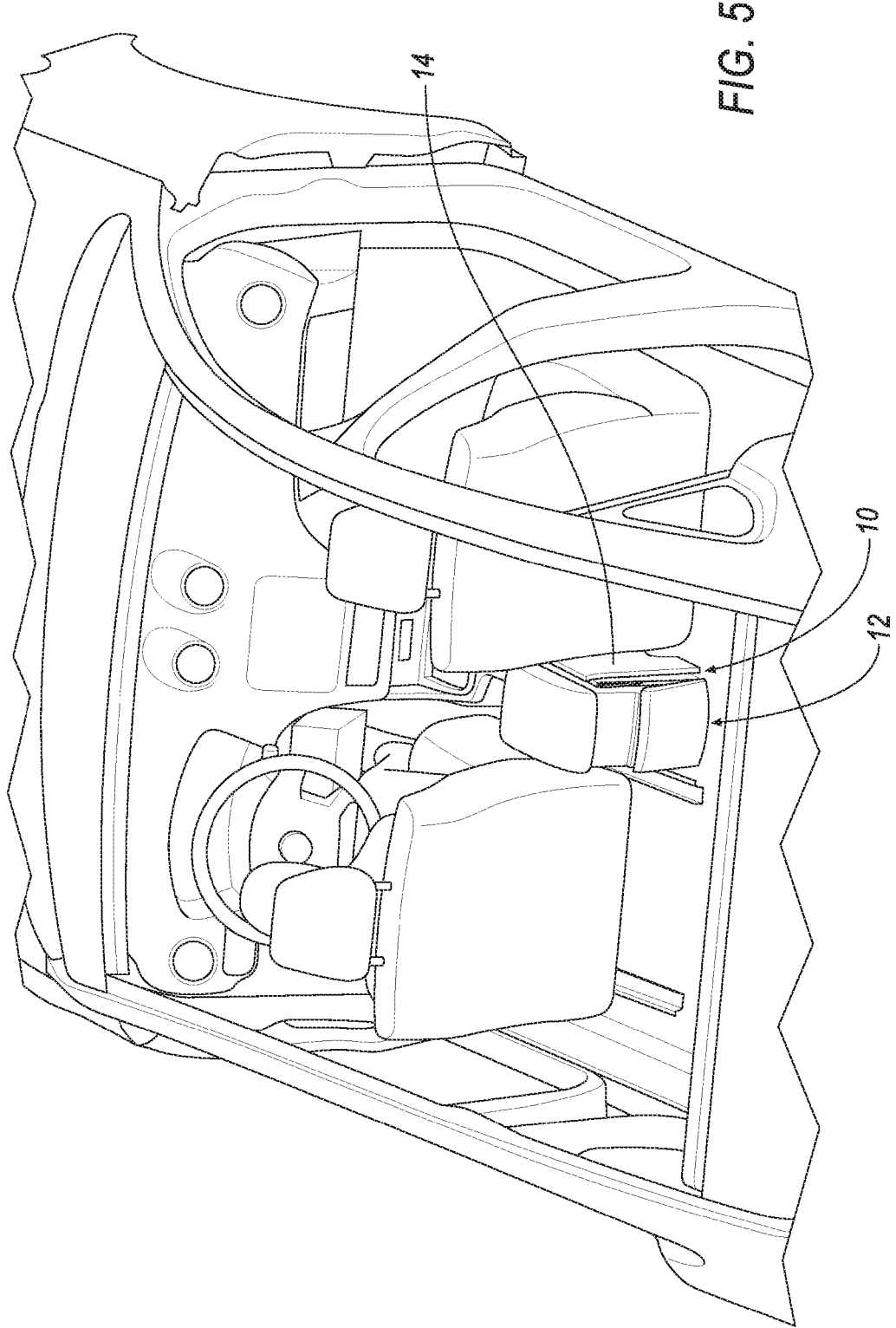

HIDDEN FOLDABLE TRAY TABLE

TECHNICAL FIELD

The present disclosure relates generally to table arrangements for rear vehicle passengers and more particularly, to a table arrangement that may be selectively stored in a central vehicle console when not in use.

BACKGROUND

Some high end luxury vehicles and limousines have trays or tables may be disposed in a rear console of a vehicle for use by passengers in the rear compartment of the vehicle so that those passengers may place a book table, cell phone, drinking glasses, or other light weight consumer infotainment or personal item on the tray or table. These configurations can be quite costly, as the rear console must be engineered with enough packaging space to accommodate a table or modifications must be made to the rear panel of the vehicle compartment.

Other known arrangements include flip down trays/tables that may be mounted to front vehicle seatbacks. However, these arrangements can lead to discomfort to the front vehicle passengers, when these trays/tables are either initially released from a storage position on the seatback or when re-stowed to the seatback, due to force on the seatback.

Accordingly, there is a need for a cost-effective tray/table arrangement that may be easily stowed, as well as utilized by the rear passengers in a vehicle.

SUMMARY

In one exemplary arrangement, a selectively storable table assembly for a vehicle is provided that comprises a support shaft and a table. The support shaft has a table mounted thereon. The support shaft is mounted for sliding and rotational movement with respect to a central vehicle console. The support shaft is slidable in a first direction from a storage position with the table positioned in a vertical orientation. The support shaft is also rotatable to move the table into a horizontal use position after removal from the storage position.

In another exemplary arrangement, a selectively storable table assembly for a vehicle comprises an outer housing member having a storage cavity therein. The outer housing member attaches to a side of a vehicle console. A support shaft supporting a table is mounted for sliding and rotational movement with respect to the vehicle console. The support shaft is slidable in a first direction from a storage position wherein the table is positioned in a vertical orientation in the cavity of the outer housing member. The support shaft is also rotatable 270 degrees from the storage position to move the table into a horizontal use position after removal from the storage position.

In yet another exemplary arrangement, a vehicle console arrangement for a vehicle is disclosed wherein the vehicle console housing has a top cover attached thereto, the top cover having a cavity therein for selectively receiving a table assembly. The table assembly is mounted in the top cover. More specifically, a pair of support shaft supporting a table member is mounted within the cavity, with the support shaft being selectively slidable outwardly along a horizontal plane from the cavity in the top cover to move the table assembly from a storage position to a use position.

BRIEF DESCRIPTION OF THE DRAWINGS

FIG. 1A is a perspective view of a first arrangement of a selectively stowable tray/table in a storage configuration;

FIG. 1B is a perspective view of the selectively stowable tray/table in a use position;

FIG. 1C is a side elevational view of an end of a support shaft of the stowable tray/table;

FIG. 3A is a perspective view of the stowable tray/table in an initial storage position;

FIG. 3B is a perspective view of the stowable tray/table when initially moved from a storage compartment;

FIG. 3C is a perspective view of the stowable tray/table when moved to the initial use position depicted in FIG. 2A;

FIG. 3D is a perspective view of the stowable tray/table when moved to the full use position depicted in FIG. 2B;

FIG. 5 is an environmental view of the stowable tray/table arrangement with the tray/table positioned in a vehicle in the storage configuration;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 6:
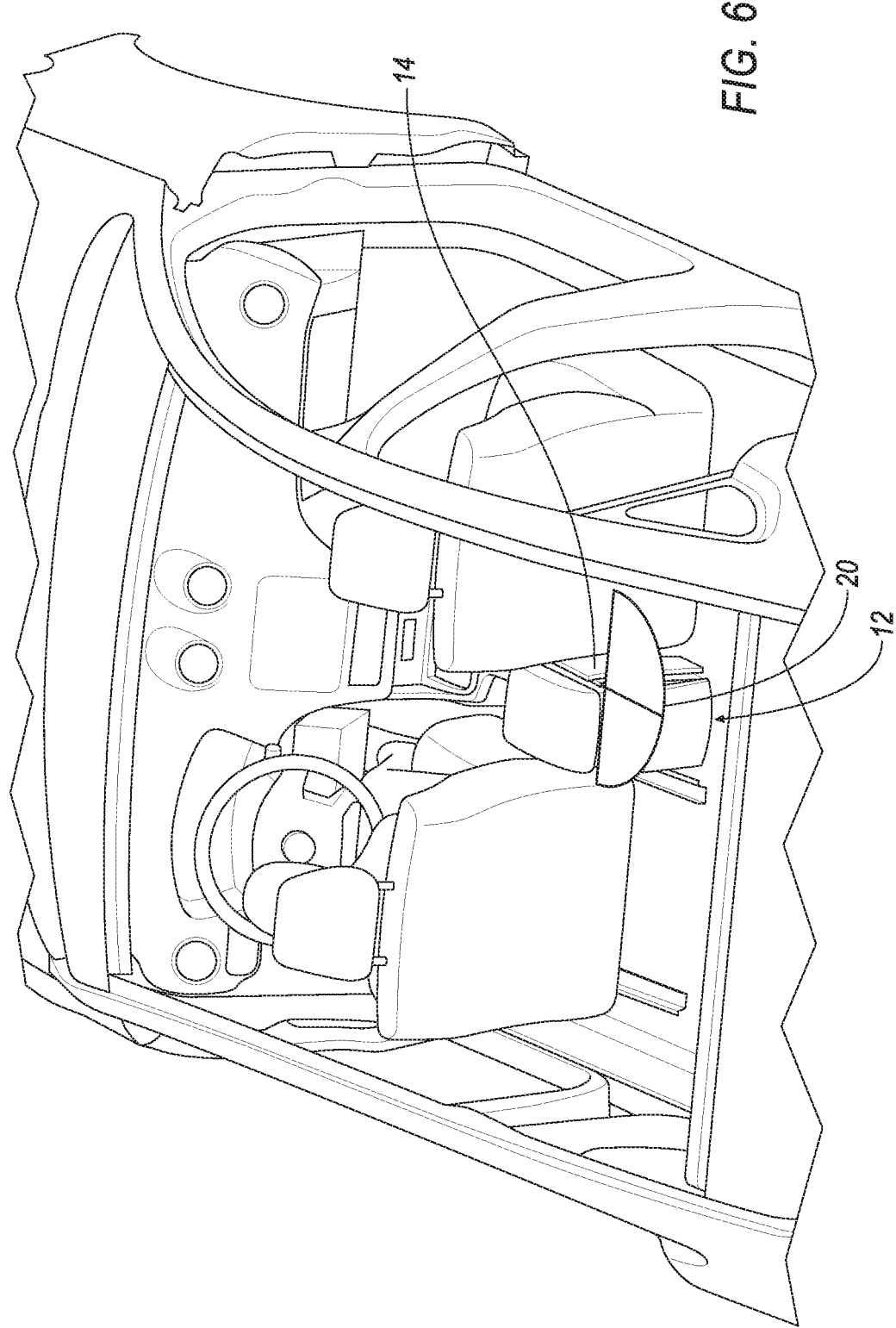
FIG. 6 is an environmental view of the stowable tray/table arrangement with the tray/table positioned in a vehicle in the full use position.

Referring to FIGS. 1A and 1B, a storable tray/table unit 10 is shown mounted to a vehicle console 12. Vehicle console 12 is positioned centrally within a vehicle. In one exemplary arrangement, vehicle console 12 is configured as a forward central console that is disposed between two front vehicle seats, as shown in FIGS. 5 and 6.

Storable tray/table unit 10 comprises an outer housing member 14 that has an elongated cavity 16 therein, a support shaft 18, and a table member 20. The support shaft 18 is mounted within the cavity 16. The table member 20 is secured to the support shaft 18.

The support shaft 18 is mounted on a sliding track that is positioned within a side wall of the cavity 16. The cavity 16 is open at the end 22 of the vehicle console 12. As will be described in further detail below, the support shaft 18 is mounted to be slidable, outwardly from the opening to the cavity 16 at the end 22 of the vehicle console 12. In one exemplary arrangement, a rearward end of the support shaft 18 may be provided with a guide member (not shown) that is received within the sliding track to facilitate controlled movement of the table member 20 during sliding. In addition, as will also be explained below, the support shaft 18 is configured to be rotatable within the cavity 16 to move the table member 20 to a use position, as shown in FIG. 1B.

Figure 2A:
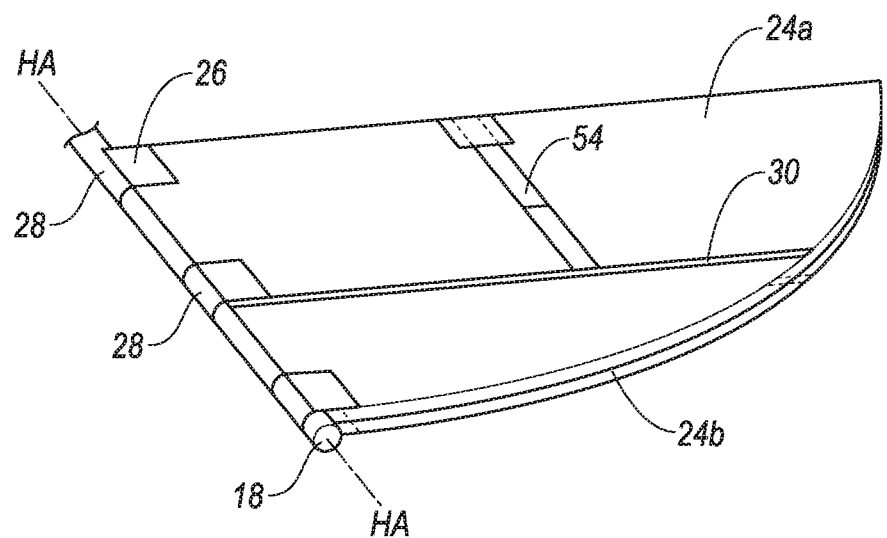
FIG. 2A is a perspective view of the tray/table when in an initial use position.
Figure 2B:
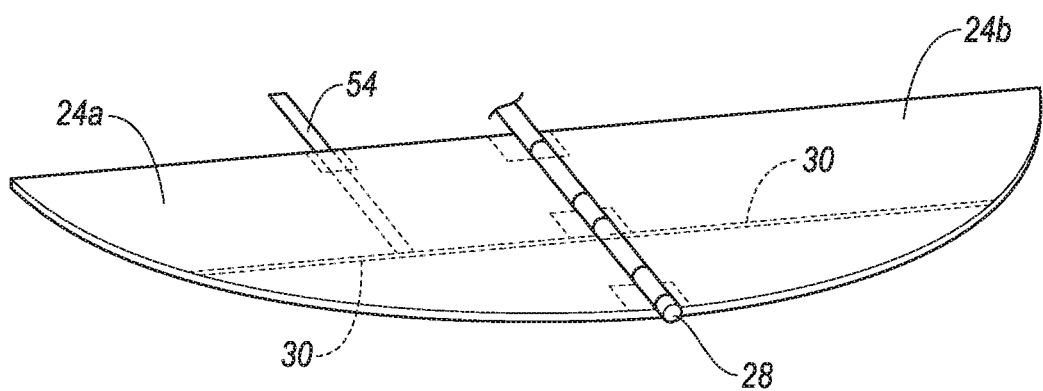
FIG. 2B is a top perspective view of the tray/table when in a full use position.

Referring to FIGS. 2A and 2B, details of the table member 20 are shown. Table member 20 includes first and second sections 24a and 24b. First and second sections 24a and 24b are pivotally connected to one another and secured to the support shaft 18 by hinge members 26. Hinge members 26 each include a sleeve channel 28 into which the support shaft 18 is mounted. To provide support weight placed on the table member 20, when position in a use position, as shown in FIG. 1B, each section of the table member 20 may further include a support shaft 30 extending transverse to a hinge axis HA about which the first and second sections 24a and 24b are positioned. The support shaft 18 may be designed to provide support for a targeted weight that the table member 20 would be expected to reliably bear during a normal expected customer use cycle.

To facilitate removal of the table member 20 from the cavity 16, a forward end 32 may be configured with a finger grip, such as a hook or knob that will extend outwardly from the cavity 16 when the table member 20 is in a stored position, as shown in FIG. 1A. The finger grip will allow for easy removal of the table member 20 from the cavity 16. An example of a finger grip 34 is shown in FIG. 1C. However, it is understood that the finger grip make take on different configurations.

Operation of the support tray/table unit 10 will now be explained in connection with FIGS. 3A-3D. FIG. 3A depicts the stored position of the table member 20. In this configuration, the support shaft 18 is seated within the cavity 16. If provided, the finger grip 34 will extend out of the cavity 16 for easy access by a rear passenger in a vehicle. The table member 20 is arranged to hang vertically from the support shaft 18 within the cavity 16. This configuration allows for easy storage of the table member 20, but without causing significant packaging concerns, conveniently utilizing the space between the vehicle console 12 and a forward vehicle seat.

Figure 4A:
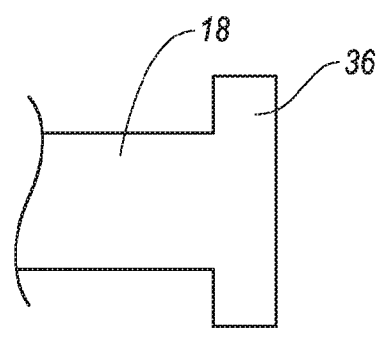
FIG. 4A is a partial elevational view of an end of the support shaft with a stopper element for preventing full dislodgement of the support shaft from the storage compartment.

Next, referring to FIG. 3B, the table member 20 is slid outwardly from the front end 22 of the vehicle console 12, until the table member 20 has fully exited the cavity 16. In one exemplary arrangement, a rear end of the support shaft 18 may be provided with a stopper member 36, such as an annular flange (shown in FIG. 4A) that bears against an inside surface of the outer housing 14 at the opening of the cavity to prevent the support shaft 18 from being fully extracted from the cavity 16.

Figure 4B:
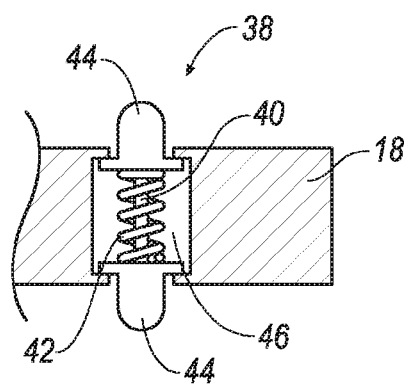
FIG. 4B is a partial cross-sectional view of an end of a support shaft with a locking mechanism.
Figure 4C:
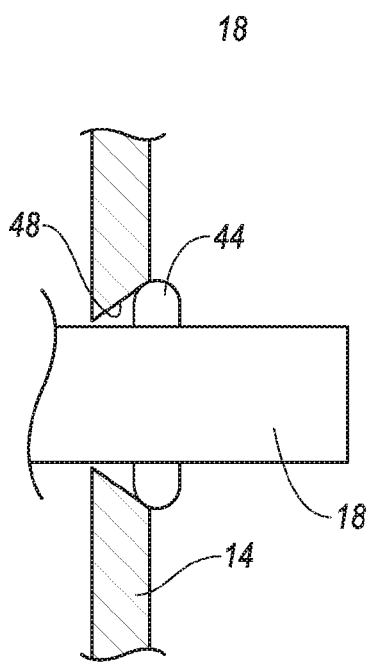
FIG. 4C is a partial elevational view of an end of the support shaft as the locking mechanism of FIG. 4B begins to exit an outer housing member.

FIG. 4B illustrates a locking mechanism 38 that may be used with support shaft 18. In one exemplary arrangement, locking mechanism 38 includes a post member 40 that supports a spring 42 thereon. Locking elements 44 are positioned on either side of the spring 42. The locking mechanism 38 is disposed within a channel 46. Locking mechanism 38 may be used in addition to the stopper 36. More specifically, in operation, as the support shaft 18, carrying the table member 20 is moved outwardly from the cavity 16, the locking elements 44 will be forced into the channel 46, against the biasing force of the spring 42 as the locking mechanism 38 passes through the wall of the outer housing member 14. In one exemplary arrangement, the interior wall of the outer housing member 14 may include tapered directing grooves 48 (as shown in FIG. 4C) to guide the locking elements 44 into the channel 46. Once the locking mechanism 38 exits the outer housing member 14, the biasing force of the spring 42 will force the locking elements 44 to extend out of the channel 46 to lock the table member 20 against unintentional reintroduction into the cavity 16. The stopper 36 will prevent support shaft 18 from fully exiting the cavity 16. It is understood that a second locking mechanism 38 may be provided instead of the stopper 36.

Figure 4D:
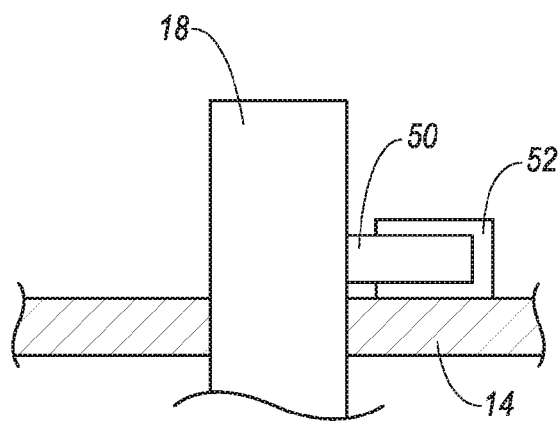
FIG. 4D is a top plan view of an end of the support shaft as a guide member contacts a guide stop disposed within the outer housing member.

Once the support shaft 18 has fully exited from the cavity 16, next the support shaft 18 is rotated 270° to an intermediate use position, as shown in FIG. 3C. In this position, a portion of the table member 20 is positioned to be generally horizontal. In one exemplary configuration, this position is accomplished by a user holding the table member 20 generally horizontal. Alternatively, an end of the support shaft 18 may be provided with a guide member 50 that comes to rest on a guide stop 52 that is disposed within the outer housing member 14, as shown in FIG. 4D to hold the table member 20 in the intermediate use position. When the table member 20 is in the intermediate use position, the first section 24a is overlaid onto the second section 24b.

Referring to FIG. 3D, the table member 20 is next moved into the full use position by lifting the first section 24a and rotating the first section 24a 180° in a direction opposite that the support shaft 18 was rotated to the intermediate use position shown in FIG. 3C. The hinge members 26 serve to hold the table member 20 in the full use position. As discussed above, the first and second sections 24a, 24b further include support members 30 that generally extend horizontally when the table member 20 is in the full use position that provide additional support for the table member 20. Alternatively, or additionally, the first section 24a may further include a secondary support member 54 that is pivotally attached to an edge of the first section 24a. The end of the secondary support member 54 may be disposed within a support opening 56 formed through the vehicle console 12, shown in FIG. 3C. While the table member 20 is shown as having first and second sections 24a, 24b with a semi-circular shape when in the full use position, it is understood that the other shapes of the table member 20 are contemplated. Further, while the table member 20 is shown as being disposed on right side of the vehicle console 12, it is understood that the disclosure is not limited to this arrangement.

When the table member 20 is positioned in its full use position (as shown in FIG. 6), the table member 20 may be used by the occupants in the rear passenger compartment of a vehicle, as shown in FIG. 6. While table member 20 is shown as having two generally planar sections 24a, 24b, alternatively, first and second sections 24a, 24b may be provided with depressions or holes to serve as cup holders.

When it is desired to re-stow the table member 20, the secondary support member 54 (if provided) is detached from the support opening 56 and the first section 24a is rotated 180° back onto the second section 24b. Once the first and second sections 24a, 24b are brought together, the table member is rotated in the opposite direction 270° to the position shown in FIG. 3B. Next, the locking mechanism 38 is compressed by the user to allow the support shaft 18 to be slid back into the cavity 16 of the outer housing until it is seated therein, as shown in FIG. 3A and FIG. 5.

Figure 7:
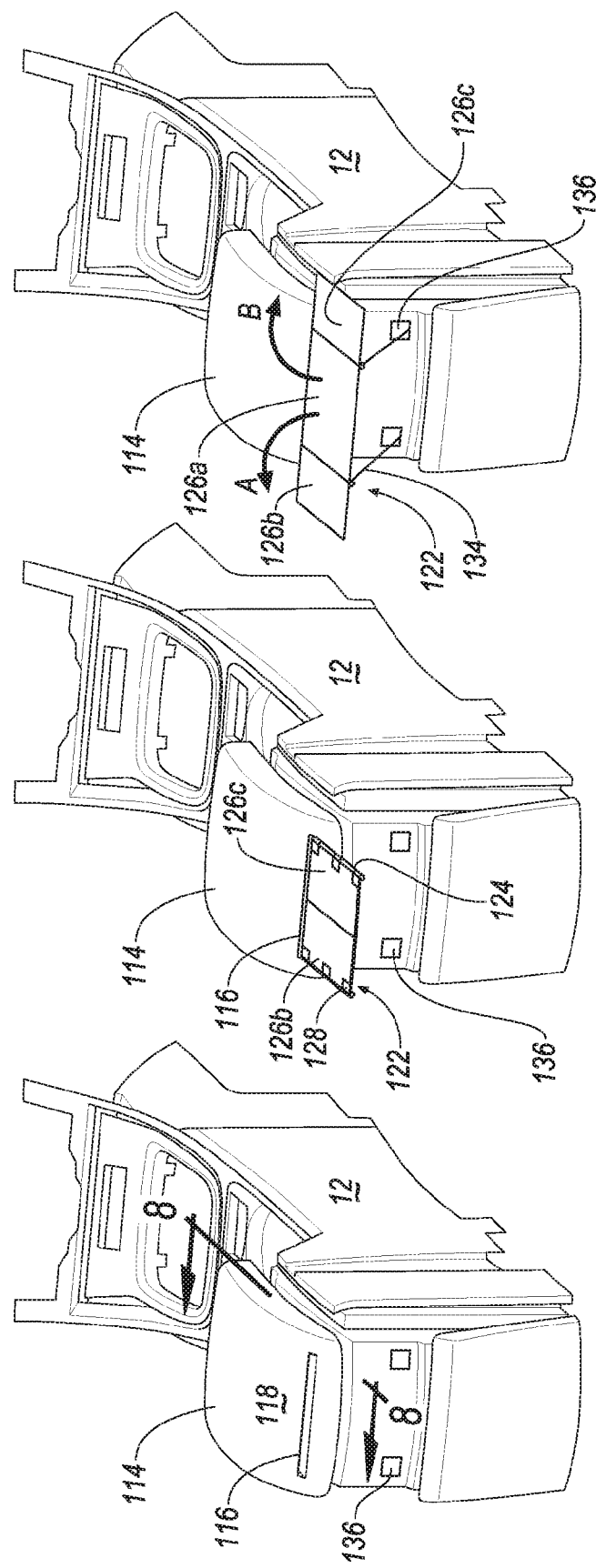
FIG. 7A is perspective view of a second arrangement of a selectively stowable tray/table in a storage configuration.
FIG. 7B is a perspective view of the selectively stowable tray/table of FIG. 7A in an initial use position, after it exits a storage cavity disposed in a vehicle console.
FIG. 7C is a perspective view of the selectively stowable tray/table of FIGS. 7A and 7B in the full use position.

Referring to FIGS. 7A-7B is an alternative storable tray/table unit 100 mounted to a vehicle console 12 that is centrally positioned within a vehicle. In the exemplary arrangement, vehicle console 12 is configured as a forward central console disposed between two front vehicle seats. However, the tray/table unit 100 may also be incorporated into a central rear vehicle console (not shown).

Figure 8:
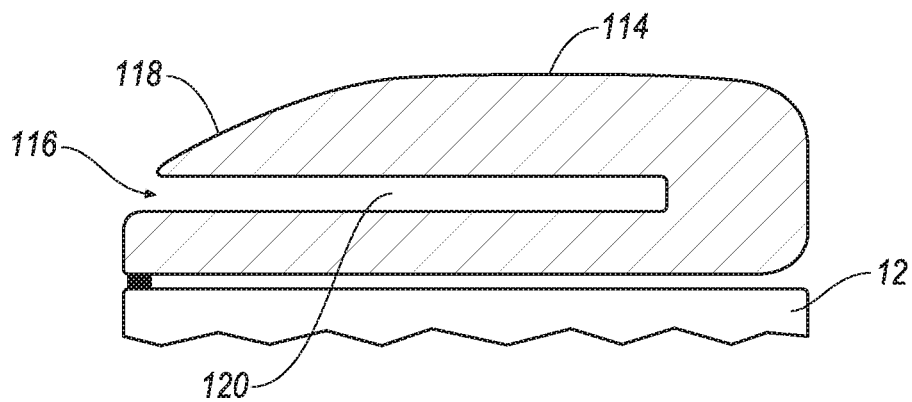
FIG. 8 is a partial cross-sectional view of a top section of a vehicle console taken along lines 8-8 of FIG. 7A.

Storable tray/table unit 100 is disposed within a top cover 114 of the vehicle console 12. A narrow slot 116 is formed through an end face 118 of the top cover 114. The narrow slot 116 opens into a cavity 120 formed in the top cover 114, as shown in FIG. 8 (additional components that are disposed within the cavity are removed for ease of explanation). The slot 116 and cavity 120 are sized to accommodate a folded table member 122, as will be explained below.

Storable tray/table unit 100 comprises a pair of support shafts 124, arranged spaced apart and parallel to one another, and the table member 122. The support shafts 124 are mounted within the cavity 120, and more specifically on a sliding track that is positioned within a side wall of the cavity 120. The table member 20 is secured to the support shafts 124.

As will be described in further detail below, the support shafts 124 are mounted to be slidable, outwardly from the slot 116 from the end face 118 of the top cover 114 of the vehicle console 12. In one exemplary arrangement, a rearward end of each of the support shafts 124 may be provided with a guide member (not shown) that is received within the sliding track to facilitate controlled movement of the table member 122 during sliding. Unlike the tray/table unit 10, the support shafts 124 are not configured to be rotatable within the cavity 120.

Referring to FIG. 7B, the table member 122 is shown as it exits the slot 116, in a preliminary use position. Table member 122 includes a center section 126a, and two side sections 126b, 126c. The side sections 126b and 126c are pivotally connected to an edge of the center section 126a and secured to one of the support shafts 124 by hinge members 128 (best seen in FIG. 7B). Hinge members 128 each include a sleeve channel into which a support shaft 124 is mounted, as may be seen in FIG. 9. Support shaft 124 may further include locking mechanisms on the ends of the support shaft similar to locking mechanisms 38 depicted in FIG. 4B, as well as stopper members similar to stopper member 36 depicted in FIG. 4A. Locking mechanisms 38 serve to maintain the table member 122 in an initial use position by providing resistance to the table member 122 unintentionally entering back into the cavity 120. Stopper member 36 serves to prevent the support shafts 124 from fully exiting the cavity 120, thereby accidentally dislodging the table member 122 from the vehicle console 12.

Figure 9:
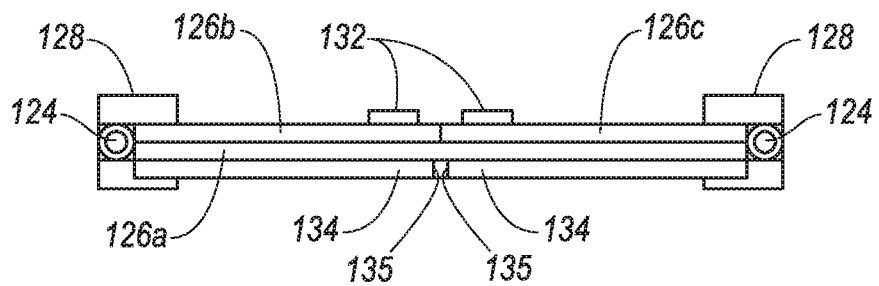
FIG. 9 is a front elevational view of the selectively stowable tray/table of FIG. 7B.

Referring to FIG. 9, when the table member 122 is in the preliminary use position, the two side sections 126b, 126c are folded toward one another and overlaid onto the center section 126a. To facilitate extraction of the table member 122 from the slot 116, each of the two side sections 126b, 126c may be provided with a finger grip, such as a hook or knob that will extend outwardly from the cavity 120 when the table member 122 is in a stored position, as shown in FIG. 7A. The finger grip will allow for easy removal of the table member 122 from the cavity 120. An example of a finger grip 132 is shown in FIG. 9. However, it is understood that the finger grip make take on different configurations. As a further alternative arrangement, the top edge of the tabled member (when in a stored position) may include an integral lip that extends out from the slot 116 when the table member 122 is in a stored position.

The storable tray/table unit 100 further includes support members 134 that are pivotally mounted to an edge of the center section 126a. When the table member 122 is in the stored position, the support member 134 are pivoted toward one another to underlie the center section 126a, as shown in FIG. 9. However, the support members 134 may also be pivoted outward and turned downwardly so that an end of the support member 134 may each be received within a support slot 136, as will be explained below.

Referring to FIGS. 7A-7C, use of the storable tray/table unit 100 will now be described. When in the stored position, the table member 122 is generally fully disposed within the cavity 120 in the top cover 114 of a vehicle console 12. More specifically, either a finger grip, such as finger grip 132, a lip (not shown), or an edge of the table member 122 is accessible at the slot 116 to allow a user to extract the table member 122 from the cavity 120 and move it into the initial use position (shown in FIG. 7B).

Figure 10A:
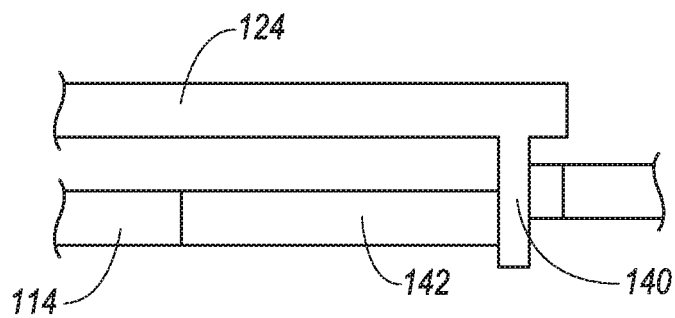
FIG. 10A is a top plan view of a support shaft disposed within the top section of a vehicle console.
Figure 10B:
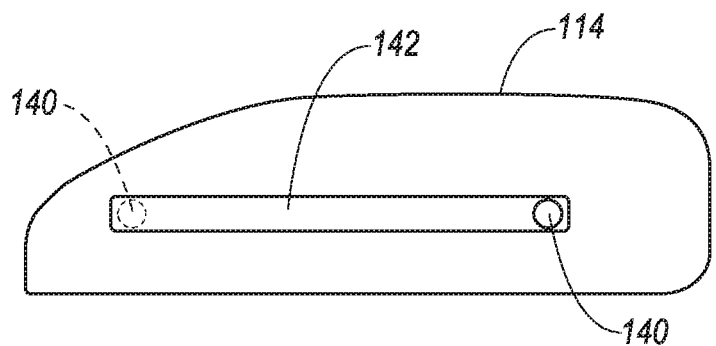
FIG. 10B is a side elevational view of the top section of the vehicle console of FIG. 10A.

As a further alternative extraction arrangement, one of the support shafts 124 may include an integral lever member 140, as shown in FIGS. 10A and 10B. The top cover 114 may be provided with an open track 142 through which the lever member 140 extends. When the table member 122 is in the stored position, the lever member 140 is in a rearward position, as shown in FIG. 10B. To move the table to the initial use position, the lever member 140 may be grasped by a user and moved to a forward position, indicated by the phantom lever in FIG. 10B. With this configuration, the lever member 140 may replace the stopper 36, as the lever member 140 will prevent the support shafts 124 from exiting the cavity.

Once the table member 122 is extracted from the cavity, the locking mechanism 38 described above in connection with FIG. 4B may be deployed to temporarily lock the table member 122 out of the cavity. As the table member 122 is stored in a horizontal position, there is no need to rotate the table member 122 into an initial use position.

Next, the side sections 126b and 126c are rotated away from one another, 180°, as well as away from the center section 126a, as indicated by arrows A and B in FIG. 7C. In this manner, the side sections 126b, 126c are unfolded from the initial use position to the full use position shown in FIG. 7C.

Hinge members 128 may be configured to provide some support for the side sections 126b and 126c when moved into the full use position. Alternatively, or in addition, support members 134 may be used. Support members 134 are folded underneath the center section 126a when in the initial use and stored positions with their respect free ends facing one another, as demonstrated in FIG. 9. The opposite ends are pivotally attached to the support shafts 124. The free ends 135 of the support members 134 are then pivoted to place the free ends 135 into support slots 136, as shown in FIG. 7C. To account for height adjustment, the support members 134 may be telescoping members and have a locking collet (not shown).

To return the table member 122 to its stored position, the support members 134 are pivoted back toward one another with the free ends facing one another under the center section. Next, the side sections 126*b* and 126*c* are rotated clockwise 180° to overlay the center section, thereby placing the table member 122 back into the initial use position shown in FIG. 7B. The table member 122 is then slid back into the cavity 120 by sliding the support shafts 124 back into the cavity through the slot 116.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A table assembly for a vehicle, comprising:
   a support shaft mounted for sliding and rotational movement with respect to a central vehicle console and having a table mounted thereon, the support shaft being slidable in a first direction from a storage position with the table positioned in a vertical orientation, the support shaft being rotatable 270° to move the table into a horizontal use position after removal from the storage position.

2. The table assembly of claim 1, wherein the table includes first and second table sections pivotally connected together with the support shaft therebetween when in the use position.

3. The table assembly of claim 2, wherein the first and second table sections are positioned adjacent to one another when in the storage position.

4. The table assembly of claim 2, wherein the horizontal use position includes an initial use position and a final use position, wherein the first and second table sections are positioned adjacent to one another while in the initial use position.

5. The table assembly of claim 4, wherein the first table section is configured to rotate 180 degrees in a second direction, away from the second table section to the final use position.

6. The table assembly of claim 1, wherein the support shaft includes a guide member that engages a guide stop disposed within the central vehicle console to hold the table in the use position.

7. The table assembly of claim 1, further comprising an outer housing member that attaches to a side of the vehicle console, wherein the outer housing member includes a cavity for storing the table in the storage position.

8. The table assembly of claim 7, further comprising a finger grip disposed on a forward end of the support shaft to facilitate extraction of the table from the cavity.

9. The table assembly of claim 7, further comprising a stopper member disposed on a rearward end of the support shaft to prevent complete extraction of the support shaft from the cavity when extracting the table from the storage position.

10. The table assembly of claim 7, further comprising a locking mechanism disposed through the support shaft, adjacent a rear end of the support shaft, the locking mechanism deploying after exiting the cavity and preventing the support shaft from unintentionally reentering the cavity from the use position.

11. The table assembly of claim 1, further comprising support members disposed on the table, transverse to the support shaft.

12. A vehicle console arrangement for a vehicle, comprising:
    an outer housing member that attaches to a side of a vehicle console housing; and
    a support shaft having a table mounted thereon that is mounted for sliding and rotational movement with respect to the vehicle console housing, wherein the support shaft is slidable in a first direction from a storage position, wherein the table is positioned in a vertical orientation in a cavity disposed within the outer housing member, and wherein the support shaft is rotatable 270 degrees from the storage position to move the table into a horizontal use position after removal from the storage position.

13. The vehicle console of claim 12, wherein the table includes first and second table sections pivotally connected together and positioned adjacent to one another when in the storage position.

14. The vehicle console of claim 13, wherein the horizontal use position includes an initial use position and a final use position, wherein the first and second table sections are positioned adjacent to one another while in the initial use position, and wherein the first table section is rotated 180 degrees in a second direction, away from the second table section to the final use position.

* * * * *